Patented May 12, 1942

2,282,780

UNITED STATES PATENT OFFICE 2,282,780

STABILIZED OLIVE OIL BLENDS WITH UNUSUAL TASTE AND FRAGRANCE

Sidney Musher, New York, N. Y., assignor to Musher Foundation Incorporated, New York, N. Y., a corporation of New York No Drawing. Application November 12, 1941, Serial No. 418,843

8 Claims. (Cl. 99—163)

This invention relates to the preparation of novel stabilized olive oil blends having unusual taste, aroma and fragrance.

In accordance with the present invention, it has been found that where ripened olives are specially dehydrated by being salted or brined and then expressed, the resultant oil is different in character, flavor and other properties than olive oil of commerce and has the unusual property when added in small proportions to other glyceride oils of developing an unusually powerful and desirable high grade olive oil fragrance and taste.

This oil may be utilized as such or in combination with other oils much more readily than olive oil normally manufactured from the unsalted, undehydrated olives.

In preparing the olives for treatment, they are picked desirably when fully ripe and before any fermentation has set in. The olives will vary in color from red to purple and they are preferably more purple than red when used in accordance with the present invention.

The olives are then packed with from 25% to 100%, and preferably about 50%, of their total weight of dry common salt by alternating layers of salt and olives. These olives packed with salt are desirably placed in wooden bins so that as the brine is formed, it will flow away from the olives.

At regular intervals of from 1 to 3 days, the olives are transferred, such as by shoveling, from one part of the bin to another part and in that way the olives are constantly kept in contact with the dry salt and there appears to be some heat which develops in the olives during the salting operation which aids in the penetration of the salt and in the development of the desired characteristics in accordance with the present invention.

This salting treatment is continued until the total moisture content of the olives is reduced to 30% or less and desirably under 25%. During this salting treatment, the olives turn black and they are utilized in black condition. The salting will require from about 20 to 45 days dependent upon whether the olive trees were previously exposed to excess rains as the higher the moisture content of the olives at the time they are packed with salt, the longer the period that is required to effect the desired dehydration.

The flesh of the dehydrated, shrivelled black olives will contain not less than about 5% of salt and desirably between 7% and 10% or more of salt.

It is of the greatest importance that the olives be fully and completely salted for, where incomplete salt concentration is used, as for example by using dilute salt brines instead of packing in dry salt, the olives undergo a type of lactic acid fermentation which produces a type of olive that cannot be used in accordance with the procedures of the present invention.

After the salting has been completed, the black shrivelled dehydrated olives are removed from the bins and may, where desired, be washed either with brine or with oil to remove the excess salt adhering to the olives.

The shrivelled black dehydrated salted olives will have lost between 20% and 45% of their total original weight. Moreover, as a result of the salting, the olive flesh will have taken up salt so that it has a substantial salt content.

These salted dehydrated shrivelled black olives are then ground into paste form or finely macerated. The olives may be ground by putting through an attrition mill or by subjecting to a stone or iron rolling or colloid mill treatment. For example, the olives may be allowed to pass between stone or iron rollers in order finely to mill and divide the olives into paste form.

The salted dehydrated black shrivelled olives may then be expressed by subjecting to hydraulic or expeller expression in order to remove the oil contained therein.

The oil obtained from these black shrivelled salted dehydrated olives does not appear to have any more pronounced flavor than any other oil from olives which have not been specially salted or dehydrated in the aforesaid manner but it has the power when added in small percentages to other glyceride oils of developing an unusually powerful and desirable high grade olive oil fragrance and taste.

However, when the oil expressed from these salted black shrivelled dehydrated olives is mixed with a flavorless oil such as with refined deodorized vegetable oils including cottonseed oil, corn oil, peanut oil, sesame oil, soya bean oil, sunflower seed oil, etc. or even with refined olive oil, there is developed a concentrated olive flavor.

This powerful flavor is developed even where as little as 2% to 10% of the olive oil prepared from the black shrivelled dehydrated salted olives is used with the refined deodorized flavorless oil.

For example, the addition of 5% of ordinary virgin olive oil of commerce made from olives which have not been subjected to the heavy salting and dehydration treatment described in accordance with the present invention, to deodorized cottonseed oil produces an oil which has hardly any aroma and but very little flavor.

Where, however, 5% of the oil expressed from the heavily salted black shrivelled dehydrated olives prepared in accordance with the present invention is added to deodorized cottonseed oil, a very noticeable and powerful olive oil aroma and flavor is imparted to the cottonseed oil.

It has furthermore been found that this oil prepared from the heavily salted dehydrated olives has a much better stability than ordinary olive oil but the intensity of its flavor and aroma characteristics are of the greatest importance and by a visual examination of the oil produced from the salted olives in comparison with ordinary olive oil, it could not be imagined that such oil would develop such a pronounced aroma and flavor characteristic when used in a minor proportion for blending with other glyceride oils referred to above.

Apparently some catalytic or chemical action occurs both in the salting and dehydration, as well as in the body of the refined glyceride oil to which the oil is added which results in the development of the novel taste and flavor characteristics when the olive is fully salted and dehydrated in accordance with the present invention.

When such black dehydrated olives are expressed, preferably by first reducing to paste form, the oil may then be admixed with or blended with other oils, preferably refined and deodorized, with unusual development of highly desirable aromatic, antioxygenic and other characteristics.

This is also particularly unusual since salt has been recognized as having pro-oxidant properties but where the black shrivelled dehydrated olives of the present invention before pressing contain as much as 7% to 10% of salt, the glyceride oils pressed from those olives possess highly desirable and unusual stabilizing characteristics.

In addition to salting the olives by placing them in bins using alternating layers of olives and salt, the olives may less preferably also be immersed in a fully concentrated or saturated brine containing 20% to 25% or more of salt, which brine will shrivel the olives without permitting any fermentation to take place.

The olives are held in that brine until the salt has thoroughly and completely penetrated through the entire flesh of the olive and the olive is thoroughly shrivelled and dehydrated.

The saturated concentrated salt brine in which the olives are immersed should contain not less than about 20% by weight of salt and desirably the salt should be held at its maximum concentration. At regular intervals of from 1 to 2 days the brine in which the olives are held should be tested and additional salt added in order to maintain the salt at its proper concentration before the salting and dehydration is permitted to continue.

Where the olives are immersed in the concentrated or saturated brine, they should be held in that brine for a period of not less than about 20 days and frequently as much as 30 to 45 days and until the salt has thoroughly penetrated into the flesh of the olives and the dehydrated and shrivelling has been completed.

The black shrivelled dehydrated olives may then be removed from the brine and are ready for expression in the aforesaid manner.

Where the salt content is not sufficiently high such as where the salt content is held at about 5% in the brine, a gaseous fermentation takes place and there is very little or no dehydration. No matter how long these olives are held in the dilute brine, the olives are not satisfactory for use in accordance with the present invention, as in the present invention it is necessary for the salting and dehydration to be completed using the fully concentrated brine or a high proportion of the dry salt over and beyond any preserving effect in order to obtain the oil desired for use in accordance with the present invention.

Less desirably, green olives may be utilized together with or in lieu of the substantially ripe olives. Where green olives are employed, they are desirably placed in the concentrated brine as they cure out more completely and more readily by being held in concentrated or saturated brine of 20% to 25% salt concentration than by being placed in wooden bins with alternating layers of olives and dry salt. These green olives blacken and dehydrate as they shrivel in the concentrated salt brine.

The olives may also be subjected to a pitting operation whereby their pits are removed and only the flesh portions are utilized. The olives may, for example, be pitted before they are salted or the olives may be subjected to a blanching or rubbing which will remove the flesh from the pits and only the flesh portion may then be subjected to the expression procedure.

The oil produced from these fully salted black shrivelled dehydrated olives may, where a more highly concentrated olive flavor is desired, be used in an amount of as much as 20% to 30% against the weight of the refined deodorized oil and the oil thus obtained will be superior to the highest grades of 100% virgin olive oil.

The flavor and aromatic characteristics imparted to a bland or flavorless deodorized oil by the use of a minor amount of the oil prepared from the salted black shrivelled dehydrated olives gives an intensity of flavor and aroma as well as intensity of antioxygenic characteristics that is not duplicated by any olive oil of commerce or which may be obtained in the usual manner from unsalted or undehydrated olives.

For example, as little as 1% to 5% of the oil of the present invention from the salted black shrivelled dehydrated olives when added to a refined deodorized oil imparts a noticeable flavor and aroma whereas it is necessary to add as much as 20% to 40% of ordinary commercial olive oil to the same refined deodorized oil in order to obtain even inferior flavor characteristics.

Where the oil obtained from the salted black shrivelled dehydrated olives is added in a small amount to the fish and fish liver oils, such as to cod liver oil, halibut liver oil, sardine oil, or to the Vitamin A containing fish oil concentrates, there is a marked lessening and frequently a complete elimination of the characteristic fish odors and flavors that are so objectionable to this class of oils. Larger proportions of this oil are used with the fish oil vitamin concentrates than with the original oils before concentration.

Although it is preferred to treat the ripened olives with a relatively large quantity of solid salt or less preferably concentrated salt brine of 20% to 25% salt concentration to shrivel, dehydrate, and cause the development of the unusual characteristics in the oil extracted from the olives, it has also been found that less desirably the ripe olives may be thoroughly macerated or ground to form a fine paste and this paste then may be mixed with relatively large quantities of solid salt or less preferably with a concentrated saturated salt brine.

The amount of solid salt added to the macerated black ripe olive paste or the ground black ripe olive paste may vary from 20% to 35%, whereas the saturated or concentrated salt brine may vary from 30% to 60%. Where a concentrated saturated salt brine is mixed with the ground ripe olive paste, it is desirable to keep adding the salt from time to time so that the salt solution which is present will always be maintained at its full concentration and desirably the solid salt or the salt brine is constantly agitated, mixed or stirred in with the paste, or this stirring is carried out at regular intervals throughout the period of treatment and until the desired change has taken place in the macerated olive paste.

After the treatment has continued and the desired change has taken place, such as after 15 to 30 days or more, the aqueous layer containing the salt brine may then be removed by decantation or centrifuging and the oily paste upon separation from the brine may then be pressed as in an hydraulic press to remove the oil therefrom. This oil will be of a type when added in small quantities of up to 5% to develop these highly unusual and unpredicted flavors, taste, odor and stability characteristics in refined glyceride oils.

Although it is above mentioned that a paste of ripe olives is preferably utilized for addition with the solid salt or concentrated saturated salt brine or 20% to 25% salt concentration, it also is possible to utilize a paste of green olives in unripe condition, in which case higher quantities of salt are necessary. In such a case, from 1½ to 2 times more salt is utilized with the green olive paste than would be utilized with the ripe olive paste.

With regard to any of these procedures, after the salted black shrivelled dehydrated olives or the olive paste has been expressed, there will be removed both the oil of the olives and also the salt brine, which brine includes the salt which has penetrated into the flesh of the olive and the small amount of moisture still left in the olive flesh.

This combination of oil and brine which is expressed from the olives or from the olive paste is then centrifuged, decanted and/or filtered or otherwise clarified in order completely to separate the salt brine and moisture from the oil and this oil is used in accordance with the procedures of the present invention.

The oil that is obtained from the salted olives and prepared in accordance with the present invention may also be utilized for addition in a minor amount such as in amounts ranging from 3% to 15% by weight to refined white petrolatum oil of the type also known as liquid petrolatum. This liquid petrolatum oil is the colorless, odorless, tasteless product, being that fraction of petroleum which is left after removing the lighter hydrocarbons having a boiling point below about 600° F., and after removal of the paraffin, followed by purification if desired with sulfuric acid, sodium hydroxide and decolorizing carbons, the preferred mineral oil having a specific gravity between about 0.82 and 0.91 to also develop an unusually high flavor, aroma, taste and odor and stability against deterioration.

The present application is particularly directed to the production of a novel oil comprising a minor proportion of an olive oil obtained by expressing salted and dehydrated olives and a major proportion of a refined glyceride oil or white petrolatum oil. The olive oil obtained by expressing the salted and dehydrated olives is more particularly claimed in application, Serial No. 365,210, filed November 12, 1940, of which the present application is a continuation in part.

Through said application, Serial No. 365,210, the present application continues in part applications, Serial No. 320,637, filed June 30, 1939, now Patent 2,221,404, issued November 12, 1940, and Serial No. 332,482, filed April 30, 1940, and through said applications continues in part the applications which matured into Patents 2,199,364 and 2,192,866.

Having described my invention, what I claim is:

1. A process of producing a novel stabilized oil which comprises thoroughly salting, shriveling and dehydrating olives, expressing said dehydrated, salted, shriveled olives to produce an oil therefrom, and then mixing said oil in a minor amount with a major amount of an oil selected from the group consisting of the glyceride oils and refined white petrolatum oil.

2. A process of producing a novel stabilized glyceride oil which comprises salting, shriveling and dehydrating ripened olives, expressing said olives, and then mixing the oil produced from said olives in a minor amount with a major amount of a refined glyceride oil.

3. In the stabilization and flavoring of glyceride oils, the step of adding to such glyceride oils a relatively small percentage of an olive oil obtained from shriveled, dehydrated, salted, black, ripe olives.

4. In the stabilization and flavoring of glyceride oils the step of adding to such glyceride oils a relatively small proportion of an olive oil obtained by expressing olives which have been dehydrated by treating them with a concentrated, substantially saturated salt brine.

5. In the stabilization and flavoring of glyceride oils the step of adding to such glyceride oils a relatively small proportion of an olive oil obtained by expressing olives which have been dehydrated by mixing them with layers of solid salt.

6. A process of producing a novel stabilized oil which comprises salting and dehydrating olives, expressing said salted, dehydrated olives to produce an oil therefrom, and then mixing said oil in a minor amount with a major amount of refined white petrolatum oil.

7. A highly stabilized, blended glyceride oil consisting of a blend of a major proportion of a glyceride oil subject to oxidative deterioration and a minor proportion of an olive oil expressed from thoroughly salted, ripe, shriveled, dehydrated olives, said olive oil stabilizing said major proportion of glyceride oil against oxidative deterioration.

8. A highly stabilized blended glyceride oil consisting of a blend of a major proportion of a refined glyceride oil subject to oxidative deterioration and a minor proportion of an olive oil expressed from thoroughly salted, ripe, shriveled, dehydrated olives, said olive oil stabilizing said major proportion of glyceride oil against oxidative deterioration.

SIDNEY MUSHER.